United States Patent [19]
Choisnet

[11] Patent Number: 5,010,775
[45] Date of Patent: Apr. 30, 1991

[54] CAPACITIVE SENSOR OF DISPLACEMENT AND TWIST ANGLE SENSOR INCLUDING AT LEAST ONE SUCH CAPACITIVE SENSOR

[75] Inventor: Joël Choisnet, La Frette sur Seine, France

[73] Assignee: Thomson-CSF, Puteaux, France

[21] Appl. No.: 497,531

[22] Filed: Mar. 22, 1990

[30] Foreign Application Priority Data

Apr. 4, 1989 [FR] France .................. 89 04402

[51] Int. Cl.⁵ .............................................. G01L 3/02
[52] U.S. Cl. ..................................... 73/862.33; 73/780
[58] Field of Search .................. 73/116, 862.33, 780; 361/280, 290

[56] References Cited

U.S. PATENT DOCUMENTS

| | | | |
|---|---|---|---|
| 3,296,522 | 1/1967 | Wolfendale | 323/93 |
| 3,487,402 | 12/1969 | Hillhouse | 340/347 |
| 4,054,049 | 10/1977 | Egger | 73/16 |
| 4,175,428 | 11/1979 | Eilersen | 73/780 X |

FOREIGN PATENT DOCUMENTS 0108894 5/1984 European Pat. Off. .
790692 2/1958 United Kingdom .

OTHER PUBLICATIONS

Patent Abstracts of Japan, vol. 9, No. 16 (P-329) (1739), Jan. 23, 1985, & JP-A-59 163 530, Sep. 14, 1984, K. Nakamura, "Electrostatic Capacity Type Torque Measuring Instrument".

Primary Examiner—Jerry W. Myracle
Attorney, Agent, or Firm—Oblon, Spivak, McClelland, Maier & Neustadt

[57] ABSTRACT

Disclosed are capacitive sensors designed to measure the very low-amplitude displacements of two zones with respect to each other. It comprises a capacitive element formed by two elements that are fitted to each other by a shrink-on method, and respectively having two facing cylindrical surfaces, the longitudinal axes of which are parallel to one and the same given direction, these surfaces bearing electrodes, at least some of which have limits parallel to the given direction. These two supports are respectively rigidly connected to the two zones, so much so that the capacitance of the capacitors formed by the electrodes of the facing surfaces varies as a function of the relative displacements of the two zones perpendicularly to the given direction. Thus the measurement of the displacements perpendicularly to this given direction is done by a measurement of variation in capacitance.

5 Claims, 4 Drawing Sheets

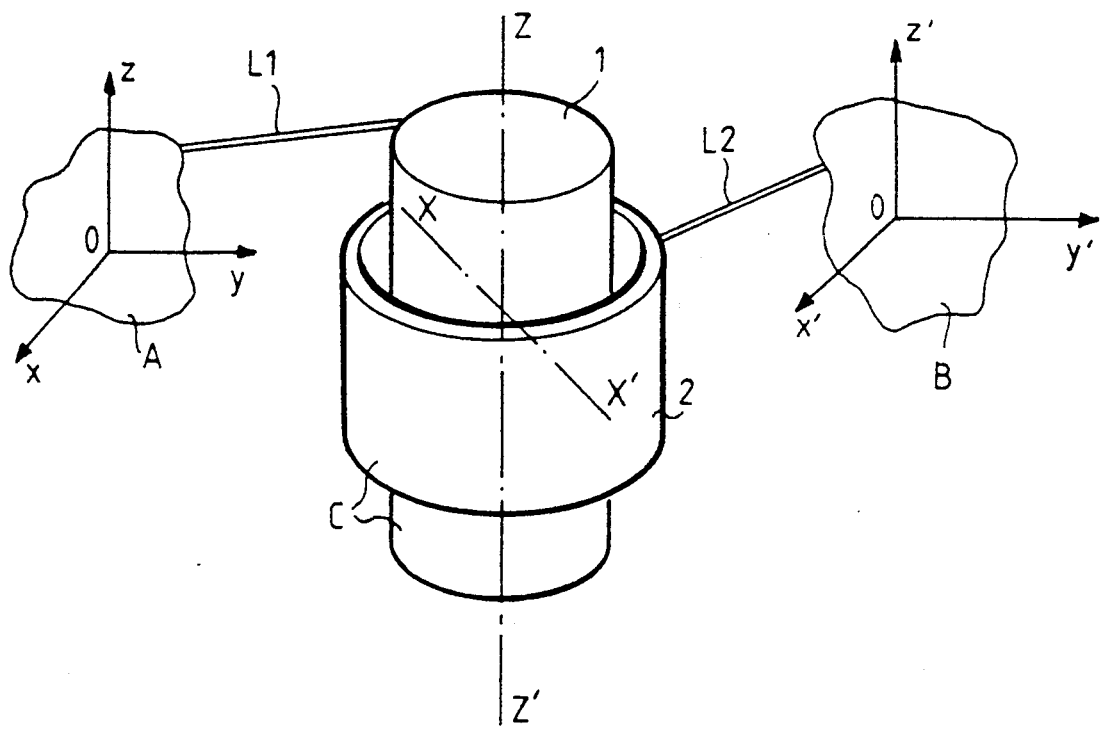
FIG_1
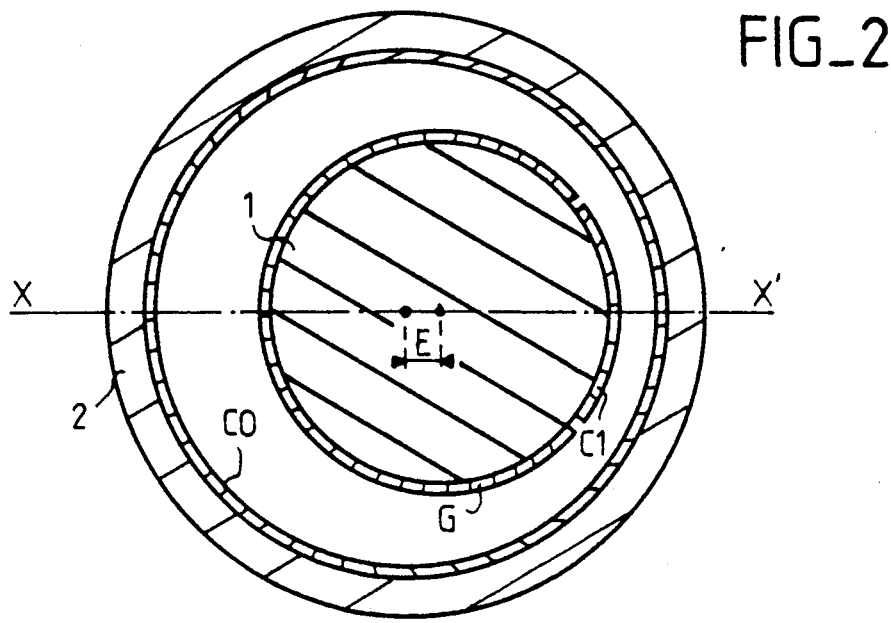
FIG_2

FIG_3
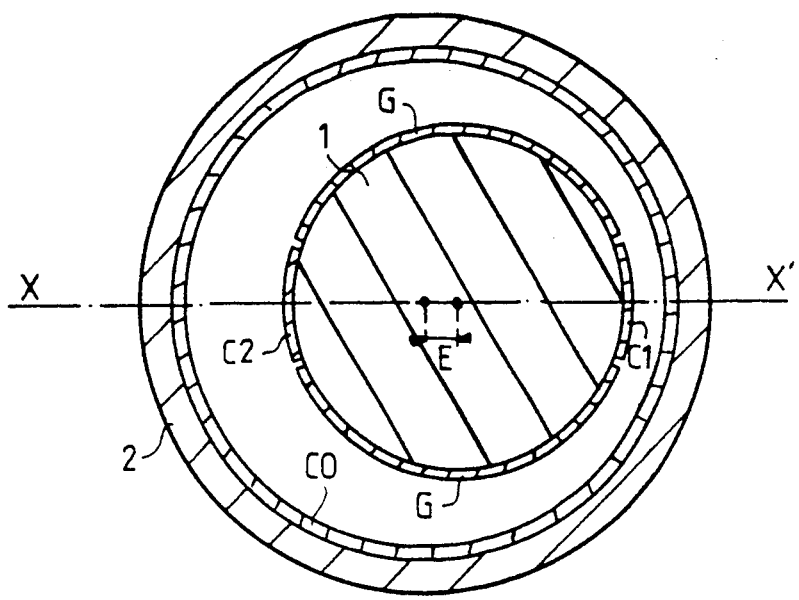
FIG_4
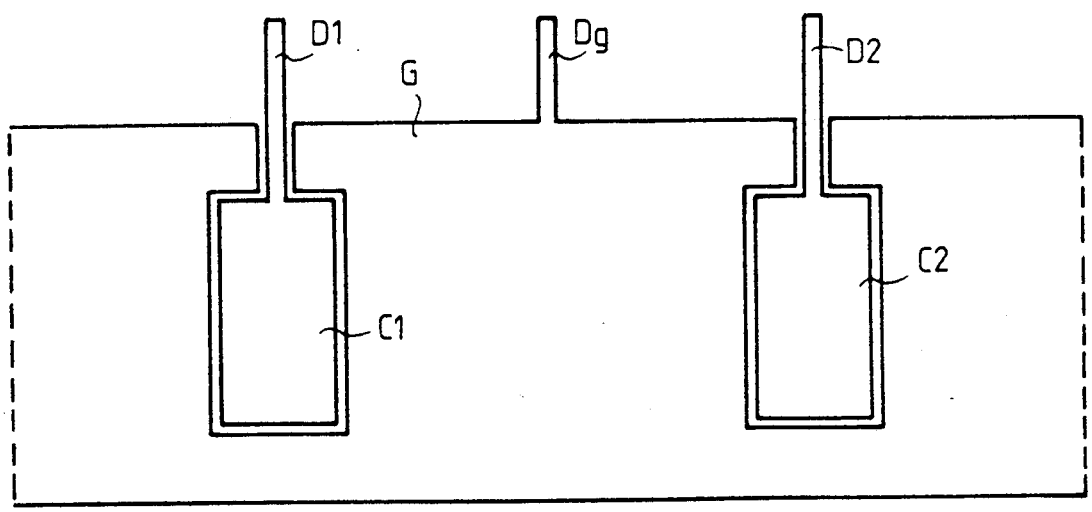

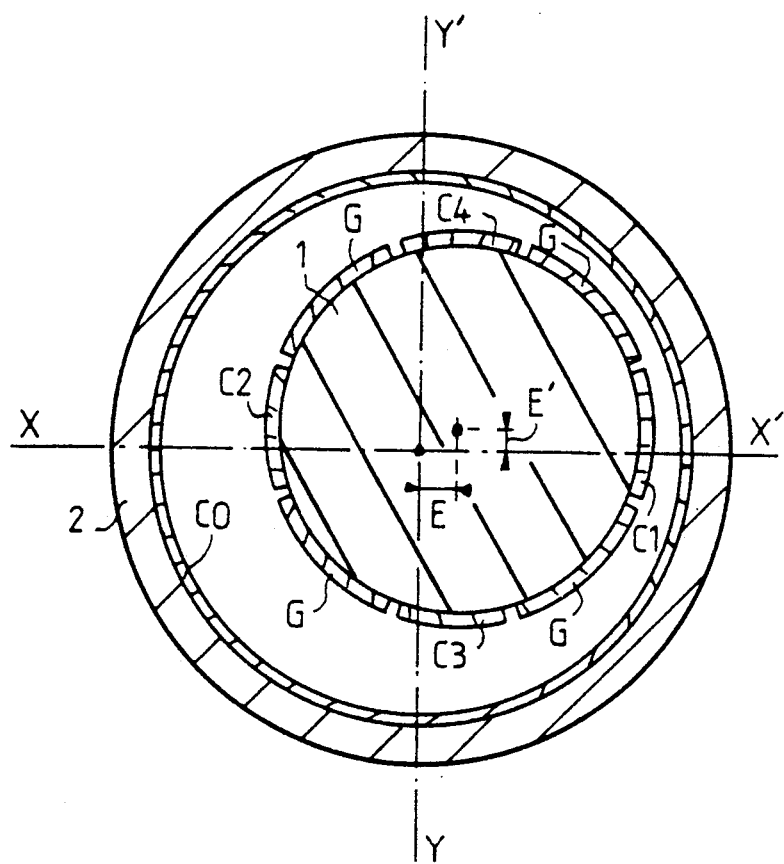

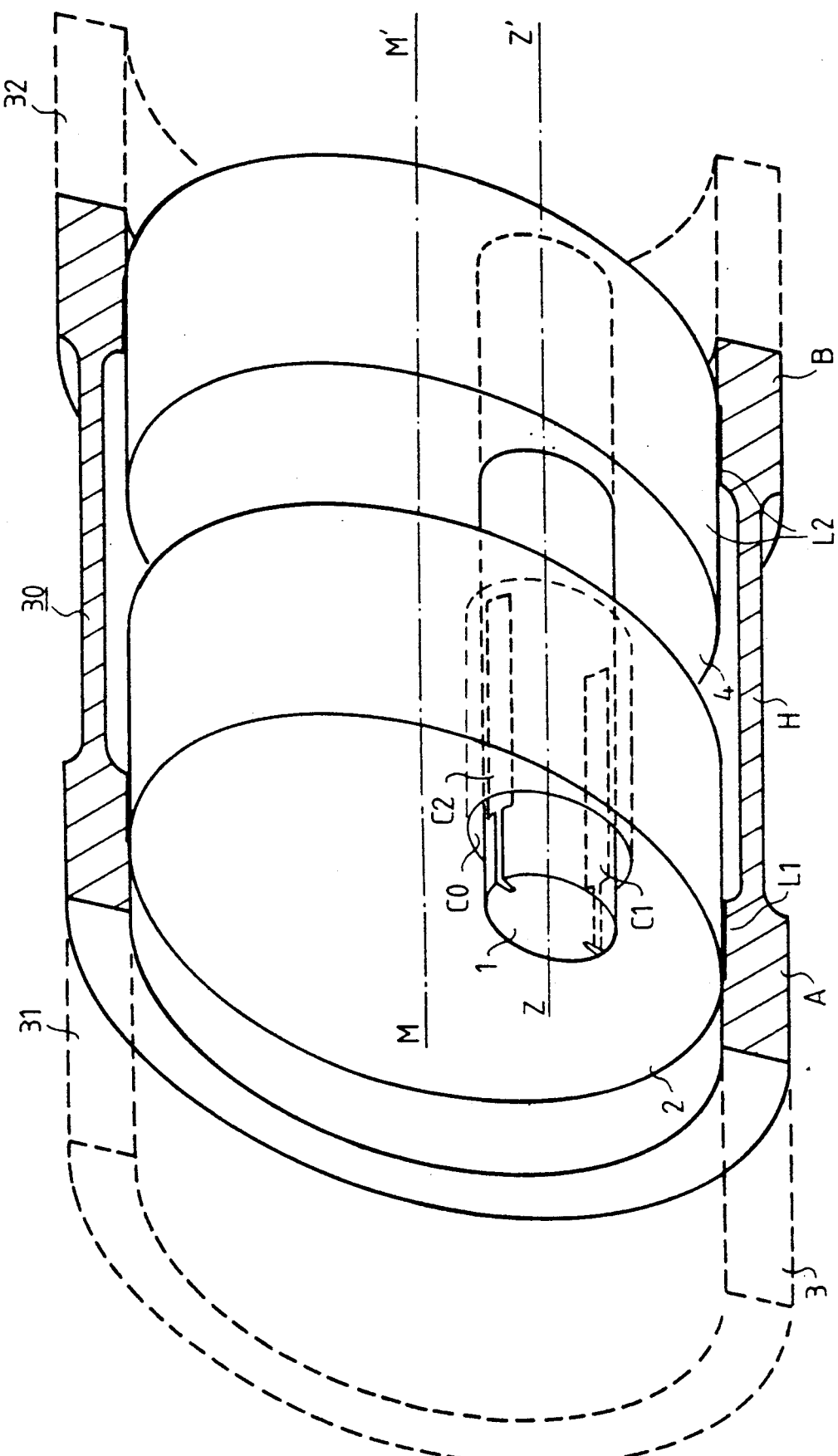

CAPACITIVE SENSOR OF DISPLACEMENT AND TWIST ANGLE SENSOR INCLUDING AT LEAST ONE SUCH CAPACITIVE SENSOR

BACKGROUND OF THE INVENTION

1. Field of the Invention

The present invention pertains to the capacitive sensors used for the measurement of displacements and, more particularly, for the measurement of very small displacements such as the twist or torsion to which an engine shaft is subjected. These measurements of displacements make it possible to determine the value of the physical magnitude that has caused the displacement: temperature, pressure, force, acceleration etc. Thus, the measurement of the angle of twist of an engine shaft makes it possible to determine the value of the engine torque transmitted by this shaft.

2. Description of the Prior Art

Capacitive sensors such as these are known. Prior art sensors are formed by capacitors with plane, parallel electrodes located at a short distance from each other but fixed in zones that are relatively distant from each other, so that the displacements of these two zones with respect to each other cause variations in capacitance that are sufficient to be used by a measuring electronic system associated with the sensor.

There are difficulties related to the making of these sensors, especially when great measuring precision is sought and when the environmental conditions are difficult, for example when there is a wide range in the working temperatures, a high degree of vibrations etc. For, the making of the measuring capacitors, the plane, parallel electrodes of which should be located at a short distance from each other but should be fixed in two zones that are relatively distant from one and the same structure to be examined, entails machining operations and assembling processes that are difficult and costly. Furthermore, the fastening of the plane electrodes or electrode supports should provide for the electrodes to be completely fixed but should not introduce mechanical stresses liable to deform the electrodes. Now, it proves to be difficult to make a fixed arrangement of this type, because of the differences between the expansion coefficients of the materials to be assembled.

SUMMARY OF THE INVENTION

It is an aim of the present invention to avoid or, at least, to reduce these drawbacks.

This is obtained by using capacitive sensors with cylindrical electrodes that enable easier assembly, for equal precision, than is the case with sensors having plane electrodes, it being possible to assemble these cylindrical electrodes in such a way that the only result of the expansion, in the brittle parts, is pressure stresses which can be easily borne by these brittle parts without risk of breakage.

According to the invention, there is provided a capacitive sensor of displacements comprising a first and a second support having, respectively, a first and a second longitudinal axis, parallel to each other, these supports being provided with electrodes to form capacitors wherein, to measure relative displacements of the two supports perpendicularly to the first and second axis, the first support has a cylindrical hole, the geometrical axis of which forms the first axis, the second support has a cylindrical rod, the geometrical axis of which forms the second axis, this rod being positioned so that it goes freely through the cylindrical hole and thus has facing walls with the hole, and the electrodes are borne by the facing walls of the hole and of the rod and have, and at least for some of them have limits parallel to the first axis and to the second axis.

It has to be noted that there also is a known way, described in the U.S. Pat. No. 4,054,049, for making a capacitive sensor with a cylindrical hole and a coaxial cylindrical rod bearing, respectively on their internal wall and on their external wall, electrodes which are all cylindrical. This sensor is designed to measure the translations of the rod in the hole along the direction of their common axis. This measurement is deduced from the variation in the capacitance due to the fact that, in the translation, one electrode of the rod, to a small extent, comes out of or enters the volume of the electrode borne by the hole. A sensor such as this is not at all suited to measurements of displacements that might take place perpendicularly to the common direction of the axis of the hole and of the rod, for the variations in capacitance due to such displacements are very small with sensors of this type.

BRIEF DESCRIPTION OF THE DRAWINGS

The present invention will be understood more clearly and other characteristics will appear from the following description and from the figures pertaining thereto. Of these figures:

FIG. 1 is a schematic diagram of a capacitive sensor according to the invention;

FIGS. 2, 3 and 5 are sectional views of capacitive sensors according to the invention;

FIG. 4 shows a spread-out view of a part of the sensor already shown in FIG. 3;

FIG. 6 is a view showing an angle sensor, according to the invention, mounted in an engine shaft.

MORE DETAILED DESCRIPTION

FIG. 1 shows how a capacitive sensor according to the invention is made. FIG. 1 shows a mechanical assembly having two non-deformable sub-assemblies A and B and a sensor C, formed by a solid cylinder 1 and a hollow cylinder 2 which, when at rest, as shall be indicated further below, have one and the same longitudinal axis ZZ'. The sub-assembly A has a related tri-rectangular reference system oxyz and the sub-assembly B has a related tri-rectangular reference system o'x'y'z'. The sensor C has electrodes located on the cylindrical wall of the solid tube 1 and on the internal wall of the hollow tube 2. These electrodes determine a certain capacitance. The cylinder 1 is fixedly joined to A by a rigid link L1, symbolized by a bar. In the same way, the cylinder 2 is fixedly joined to the sub-assembly B by a rigid link L2 symbolized by another bar.

The sensor C of FIG. 1 is designed to measure small displacements of B in the reference system oxyz related to A, these displacements being restricted to translations parallel to a direction XX' that is fixed with respect to oxyz; in this assembly, the relative displacements of A and B are identical to the relative displacements of the cylinders 1 and 2 owing to the rigid links L1, L2. The assembly according to FIG. 1 is made in such a way that, at rest, namely in an initial position serving as the starting point for the measurement of the displacements between A and B:

the axes of the cylinders 1 and 2 are merged along the axis ZZ';

the axis ZZ' is perpendicular to the direction XX' of the displacements to be measured;

These displacements of B with respect to A determine an eccentricity of the solid cylinder 1 in the hollow cylinder 2, with the axes of the cylinders 1 and 2 remaining parallel.

FIG. 2 is a sectional view of the sensor C of FIG. 1 in a plane perpendicular to ZZ' going through the cylinders 1 and 2. The hollow cylinder 2 has an electrode C0 on its entire internal wall; in FIG. 2, this electrode is represented as a conductive layer lining the internal wall of the cylinder 2 but, in embodiments where the cylinder 2 is made of conductive material, such a layer will not be necessary. The solid cylinder 1 is an insulating cylinder bearing two conductive, electrode-forming layers on its wall: one electrode proper C1 positioned, in the sectional view of FIG. 2, between two generatrices of the cylinder, at a distance from each other of about 70 degrees, and one guard ring G, insulated from the electrode C1, with its section between two generatrices of the cylinder at a distance of some degrees from the two generatrices demarcating the electrode C1. The electrodes C0 and C1 form the two electrodes of a capacitor, the capacitance of which varies with the eccentricity E of the cylinders 1 and 2 with respect to each other. The reverse of the value of the capacitance is a substantially linear function of the eccentricity E, the linearity being all the greater as:

the ratio between the radius of the solid cylinder 1 and the radius of the hollow cylinder 2 is closer to 1, the angle between the generatrices that demarcate the electrode C1 is small, the maximum value that the eccentricity may assume is small as compared with the radius of the solid cylinder.

FIG. 3 is a sectional view pertaining to another way of making the sensor C of FIG. 1. Here too, the hollow cylinder 2 bears, on its entire internal wall, an electrode C0 represented as a conductive layer, and the solid cylinder A bears a guard ring G. However, in this example, this guard ring surrounds not just one but two electrodes proper, C1 and C2, as can be seen in FIG. 4, which is an spread-out view of these electrodes after a cut along a generatrix of the solid cylinder; the edges of the cut are shown in broken lines in FIG. 4. FIG. 4 also shows the connections D1, D2, Dg relating, respectively, to the electrodes C1, C2, G.

The sensor according to FIGS. 3 and 4 is distinguished from the sensor according to FIG. 2 essentially by the presence of the additional electrode C2, symmetrical to the electrode C1 with respect to the axis of the solid cylinder 1. Along with the electrode C0, this additional electrode forms a second measurement capacitor, the capacitance of which varies also with the eccentricity E, but in the opposite direction to the variations of the capacitor formed by the electrode C1 with the electrode C0. Let C1 and C2 be the values of the two capacitors C1, C0 and C2, C0. It must be noted, for equal dimensions besides, that the ratio $(C1-C2)/(C1+C2)$ obtained with the sensor according to FIGS. 3 and 4, has greater linearity as a function of the eccentricity E than the linearity of Cl as a function of E, in the case of the sensor according to FIG. 2. Furthermore, when the eccentricity E is measured by means of the ratio $(C1-C2)/(C1+C2)$, the drifts, if any, related to the variation of the dielectric constant of the inter-electrode medium are removed. This is also the case with the zero drifts related to the dimensional variations of the cylinders 1 and 2 with the temperature. On the other hand, these drifts disturb the eccentricity E, achieved solely from the value of the capacitor C1.

These capacitive sensors, with electrodes positioned as indicated in FIGS. 2 and 3, enable the measurement of the very small displacements along the direction XX' but are practically insensitive to very small displacements along the axis ZZ' (see FIG. 1) common to the cylinders 1 and 2 in their idle position, and are also practically insensitive to very small displacements along an axis YY' perpendicular to XX' and ZZ', namely along an axis which would be perpendicular to XX' in the plane of the FIGS. 2 and 3.

FIG. 5 shows a sectional view, in a plane perpendicular to the axis of the two electrode-holder cylinders, of a capacitive sensor enabling the measurement of very small displacements along the axes XX' and YY' which have just been referred to above. The sensor is distinguished from the one described with reference to FIGS. 3 and 4 only by the addition of two additional electrodes, C3, C4, to the wall of the solid cylinder 1. These electrodes are located at 90 degrees to the electrodes C1, C2, around the axis of the cylinder 1. This positioning of electrodes enables the measurement of the components, along XX', of the displacements by means of the capacitors C1 and C2, respectively formed by the electrodes C0, C1 and C0, C2 and the components along YY' by means of the capacitors C3, C4, respectively formed by the electrodes C0, C3 and C0, C4.

FIG. 6 shows how a twist angle sensor, mounted on an engine shaft 3, has been made with a capacitive sensor of the type described with the help of FIGS. 1, 3 and 4. FIG. 6 is a simplified view in which various elements have not been shown in order to make it lighter and easier to understand.

The engine shaft 3 is hollow and has three metal parts: an intermediate tube 30, extended at each of its ends by tubes 31, 32 which have been shown on only a small part of their length. These tubes 31, 32 have been drawn in broken lines and their joining to the tube 30 which, in the example described, is a joining by flanges, fastened together by screws, has not been shown. Furthermore, only half of these three tubes, obtained by a sectional plane passing through the axis MM' of the shaft 3, is seen in FIG. 6 so as to let the content of the intermediate tube 30 be seen.

The tube 30 does not have a constant thickness throughout its length. It has two thick parts, A, B, respectively located at its two ends, on either side of a thinner part H. Under the effect of the forces undergone by the engine shaft 3 during its operation, the torsion is greater in the part H than in the rest of the shaft, and it is here that a measurement is made with a capacitive sensor in order to enable the torque value transmitted by the shaft 3 to be measured. For this, two metal parts 2, 4, forming caps, are respectively supported on the internal wall of the parts A and B, to which they are rigidly and fixedly joined by welding or soldering. In FIG. 6, these joints by soldering have been drawn with thicker lines. The parts 2 and 4 are pierced with cylindrical holes which are aligned along one and the same axis ZZ' when the shaft 3 is subjected to no torque. The hole pierced in the part 2 is a hole, the metal wall of which corresponds to the electrode C0 of the FIGS. 2, 3 and 5. One end of an insulating cylindrical ceramic rod 1 is driven into the hole of the part 4. The mounting of the rod 1 in the part 4 is done by shrink-on fitting, the ceramic rod being cooled and the metal part 4 being heated before being assembled. The rod 1 extends inwards and slightly beyond the hole pierced in the part 2. At the level where it crosses the hole pierced in the part 2, the rod 1 has, on its wall, two electrodes C1, C2 obtained by silk-screen printing. These electrodes correspond to the electrodes C1, C2 described by means of FIGS. 3 and 4.

In FIG. 6, the guard ring borne by the rod 1 and corresponding to the electrode G of FIGS. 3 and 4 has not been shown, just as the following have not been shown:

three other capacitive sensors which are respectively offset by 90°, 180° and 270°, around the axis MM', with respect to the sensor drawn in this figure;

the coupling device providing the electrical connection among the four sensors which rotate, with the engine shaft 3, around the axis MM' and the electronic circuits for the us of the signals given by the capacitors. These electronic circuits are fixed with respect to the axis MM' and the coupling device, in the example described, is a rotating transformer with several windings, the rotor of which is fixedly joined to the engine shaft 3 and the stator of which is fixed with respect to the axis MM' of the shaft 3.

It must be noted that the link L1 of the sensor according to FIG. 1 corresponds, in FIG. 6, to the weld or solder between the part 2 and the thick part A of the tube 30 while the link L2 corresponds, in FIG. 6, to the part 4 and to the weld or solder between the part 4 and the thick part B of the tube 30.

By way of an indication, the engine shaft of FIG. 6 is driven by a 300 kW engine at a speed of rotation that may reach 10000 rpm, and its external diameter is 5 centimeters.

The present invention is not restricted to the above-described examples. Thus, the capacitive sensors according to the invention may include and whole number of evenly distributed electrodes, and it must be noted that, with three electrodes at 120° with respect to one another, it is possible to perform the same measurements of displacement as with the four-electrode sensor according to FIG. 5, but it is more complicated to use the signals.

In the same way, with one or more capacitive sensors according to the invention, it is possible to measure not only angles of rotation of a zone A with respect to a zone B, but it is also possible to measure and low-amplitude displacement of one zone with respect to another, provided that the positioning of these zones permits the setting up of an assembly that is like the schematic assembly according to FIG. 1.

What is claimed is:

1. A capacitive sensor of displacements comprising a first and a second support having, respectively, a first and a second longitudinal axis, parallel to each other, these supports being provided with electrodes to form capacitors wherein, to measure relative displacements of the two supports perpendicularly to the first and second axis, the first support has a cylindrical hole, the geometrical axis of which forms the first axis, the second support has a cylindrical rod, the geometrical axis of which forms the second axis, this rod being positioned so that it goes freely through the cylindrical hole and thus has facing walls with the hole, and the electrodes are borne by the facing walls of the hole and of the rod, some of said electrodes being borne on the same wall and separated from each other by a gap parallel to the first axis and to the second axis.

2. A capacitive sensor according to claim 1, wherein the wall of the hole of the first support is entirely conductive and formed by one of said electrodes, and wherein the cylindrical rod is insulating and bears said other electrodes.

3. A capacitive sensor according to claim 2, wherein said other electrodes include n main electrodes, wherein n is a positive whole number, positioned substantially along n generatrices of the cylindrical rod and distributed at 360°/n with respect to one another, and a guard ring that partially surrounds each of the main electrodes.

4. A sensor of the the twist angle of an engine shaft with a given geometrical axis comprising m capacitive sensors of displacements, with m being a positive whole number, each capacitive sensor comprising a first and a second support mounted on said engine shaft having, respectively, a first and a second longitudinal axis, parallel to each other, these supports being provided with electrodes to form capacitors wherein, to measure relative displacements of the two support perpendicularly to the first and second axis, the first support has a cylindrical hole, the geometrical axis of which forms the first axis, the second support has a cylindrical rod, the geometrical axis of which forms the second axis, this rod being positioned so that it goes freely through the cylindrical hole and thus has facing walls with the hole, and the electrodes are borne by the facing walls of the hole and of the rod, some of said electrodes being borne on the same wall and separate from each other by a gap parallel to the first axis and to the second axis.

5. An angle sensor according to claim 4, comprising a hollow cylindrical part designed to be interposed in the engine shaft to form a section thereof, and wherein the m capacitive sensors are housed within the hollow cylindrical part, with their first supports fixedly joined to one of the ends of the section and their rods fixedly joined to the other end of the section.

* * * * *